3,541,024
GENERAL PURPOSE HYDROCARBON SOLVENT FOR EMULSION-TYPE, RESIN-BONDED, PIGMENT PRINTING PASTES

Herman S. Weisz, Bernard Scheffler, and Wallace W. Neely, Rock Hill, S.C., and John B. Fisher, Charlotte, N.C., assignors to M. Lowenstein & Sons, Inc., New York, N.Y., a corporation of New York
No Drawing. Filed Apr. 10, 1968, Ser. No. 720,389
Int. Cl. B01f 1/00; C08h 17/22; C09b 67/00
U.S. Cl. 252—364                     1 Claim

ABSTRACT OF THE DISCLOSURE

A solvent is provided for general use in formulating emulsion-type, resin-bonded, pigment printing pastes, which is equally effective in preparing the concentrated pigment and clear components and for cutting the clear in the course of formulation. This solvent is a composite hydrocarbon derived from petroleum and having a percentage composition by volume of 60% aromatics, 20% naphthenes and 20% paraffins and is further characterized by having a K–B number of 59 and a ASTM distillation range (° F.) of 324 to 385.

BACKGROUND OF THE INVENTION

Textile piece goods are currently printed extensively with emulsion-type, resin-bonded, pigment printing pastes. Formulation of the printing paste involves preparation of a pigment color concentrate by suspending the pigment in an emulsion containing the resin binder dissolved in a solvent as one phase, emulsifying a similar concentrated clear that contains no pigment, cutting the concentrated clear with solvent and water to a suitable extent, and then mixing the cut clear with the pigment emulsion in the proper portions for the shade desired.

While the foregoing formulation technique is fairly simple and straightforward, it has heretofore generally required use of a variety of solvents at the emulsification and cutting steps in order to obtain satisfactory practical results, and this circumstance has imposed troublesome inventory and handling problems on production operations.

The present invention eliminates these problems by providing a general purpose solvent that serves alone with equal effectiveness at all of the formulation steps.

SUMMARY OF THE INVENTION

The general purpose solvent of the present invention is a composite hydrocarbon derived from petroleum, which is available as Cyclosol 40, under the Product Code 84075, from Shell Chemical Company. By percentage composition, this solvent contains aromatics in the order of 60% by volume, together with about 20% each of naphthenes and paraffins, and it appears that the relatively high aromatics content accounts for its general purpose effectiveness, despite the fact that the resulting solvent power is higher than has heretofore been thought desirable.

Previously established practice has generally fixed a limitation on Kauri-Butanol value or number of the solvent used to the 40 to 50 range, because it has been felt that color yield is lowered unduly at higher values. The solvent provided by this invention, however, allows equally good, and in some instances even better, color results than are otherwise obtainable, even though it has a K–B number in the order of 59.

The presently provided solvent is also characterized by a relatively narrow distillation range from an initial boiling point in the order of 324° F. Specifically, the ASTM distillation range (° F.) has been found to be as follows: IBP—324; 10%—327; 20%—327; 30%—329; 40%—330; 50%—332; 60%—335; 70%—338; 80%—343; 90%—354; 95%—368; DP—379; EP—385.

Other particular physical properties of the solvent that have been established are:

| | |
|---|---|
| API gravity at 60° F. | 37.8 |
| TCC flash point, ° F. | 109 |
| K–B number | 59 |
| Mixed APC, ° F. | 101 |
| Min. viscosity at 77° F. | 1.1 |
| Saybolt color | Plus 30 |

DESCRIPTION OF THE PREFERRED EMBODIMENT

Use of the foregoing solvent in accordance with the present invention is illustrated by the following examples, in which the term "solvent" when used in the singular form always indicates the foregoing solvent of this invention, and in which all indicated proportions are given in parts by weight.

EXAMPLE I

For a water-in-oil formulation a concentrated pigment emulsion was prepared in which the composition was:

| | |
|---|---|
| Solvent | 51.250 |
| Ethyl cellulose solution | 5.375 |
| Melamine resin | 7.125 |
| Emulsifier additive (sorbitan trioleate) | .500 |
| Carbon black dispersion (CI Pigment Black 7) | 34.375 |
| Water | 1.375 |

The indicated solvent content replaced the same aggregate proportion of Varsol, pine oil, and turpentine that had all been used previously in this formulation to obtain satisfactory results.

A concentrated clear was then prepared in the following form:

| | |
|---|---|
| Solvent | 20.2125 |
| Melamine resin | 3.1250 |
| Alkyd resin | 38.4375 |
| Potassium alum | 1.8750 |
| Ammonia | .7500 |
| Cobalt naphthenate | .6875 |
| Water | 34.9125 |

Type 2 Varsol had previously been used in the formulating this clear. The solvent of this invention served equally well in the same proportion.

Cutting of the foregoing clear was done in the following proportions:

| | |
|---|---|
| Solvent | 25.38 |
| Concentrated clear | 1.84 |
| Water | 72.78 |

Previously it had been found necessary to dilute this clear first with xylol and then to complete the cutting with Varsol in order to obtain satisfactory results. The solvent of this invention serves effectively alone in the same aggregate proportion.

The cut clear was then mixed with the pigment emulsion in the proportions needed for the desired color yield, and the resulting printing paste was used for production printing of cotton piece goods with results fully comparable to those obtained previously with the other indicated solvent combinations.

Other pigment colors are formulated with equal success in the same manner, as illustrated by the following further examples.

EXAMPLE II

The solvent of this invention was substituted satisfactorily in the same aggregate proportion for Varsol and turpentine in preparing a concentrated pigment emulsion composed of:

| | |
|---|---|
| Solvent | 45.625 |
| Ethyl cellulose solution | 3.125 |
| Melamine resin | 7.812 |
| Benzidine yellow OT slurry (CI Pigment Yellow 14) | 35.000 |
| Butadiene-styrene latex | 5.000 |
| Water | 3.438 |

EXAMPLE III

A stronger color was produced by substituting the solvent of this invention for a combination of xylol, pine oil, and turpentine in the same aggregate proportion in preparing the following concentrated pigment emulsion:

| | |
|---|---|
| Solvent | 47.2500 |
| Ethyl cellulose solution | 5.8750 |
| Melamine resin | 8.2500 |
| Phthalocyanine blue dispersion (CI Pigment Blue 15) | 22.5625 |
| Water | 16.0625 |

EXAMPLE IV

A combination of xylol, pine oil, and turpentine was also replaced effectively in the same aggregate proportion in the following formulation:

| | |
|---|---|
| Solvent | 46.8804 |
| Ethyl cellulose solution | 5.7364 |
| Melamine resin | 7.6480 |
| Tamol dispersed red slurry (CI Pigment Red 5) | 38.2680 |
| Water | 1.4672 |

All of the foregoing examples illustrate the application of the solvent of this invention for formulating pigment printing pastes of the water-in-oil type, as the solvent was developed particularly for this purpose, but it serves as well for oil-in-water formulations as illustrated by the following additional example.

EXAMPLE V

For oil-in-water formulation, a typical concentrated pigment emulsion was composed of:

| | |
|---|---|
| Solvent | 6.25 |
| Methyl cellulose solution | 13.75 |
| Methylated urea-formaldehyde | 10.70 |
| Phthalocyanine blue dispersion (CI Pigment Blue 15) | 50.00 |
| Butadiene-styrene emulsion | 6.25 |
| Ammonia | 1.65 |
| Water | 11.40 |

The concentrated clear for the formulation had the following form:

| | |
|---|---|
| High viscosity methyl-cellulose ether | 50.0 |
| Sodium lauryl sulfate | 25.0 |
| Butylated melamine resin | 25.0 |

This concentrated clear was cut as follows:

| | |
|---|---|
| Solvent | 50.0 |
| Concentrated clear | 2.0 |
| Water | 48.0 |

Mixing of the cut clear with the pigment emulsion for the desired color yield was done in the usual manner, and the resulting printing paste range excellently in production printing of cotton piece goods.

The present invention has been described in detail above for purposes of illustration only and is not intended to be limited by this description or otherwise except as defined in the appended claim.

What is claimed is:

1. A general purpose solvent for use in formulating emulsion-type, resin-bonded, pigment printing pastes, said solvent being a composite hydrocarbon derived from petroleum and having a percentage composition of aromatics by volume in the order of 60% together with about 20% each of naphthenes and paraffins and having other particular properties in the order of:

| | |
|---|---|
| API gravity at 60° F. | 37.8 |
| TCC flash point, ° F. | 109 |
| K-B Number | 59 |
| Mixed ACP, ° F. | 101 |
| Min. viscosity at 77° F. | 1.1 |
| Saybolt color | Plus 30 | and having a relatively narrow ASTM distillation range (° F.) as follows:

IBP–324; 10%—327; 20%—327; 30%—329; 40%—330; 50%—332; 60%—335; 70%—338; 80%—343; 90%—354; 95%—368; DP—379; Ep—385.

References Cited

UNITED STATES PATENTS 2,828,180  4/1958  Sertorio _____ 8—174 X

LEON D. ROSDOL, Primary Examiner

D. L. ALBRECHT, Assistant Examiner

U.S. Cl. X.R.

8—94, 174; 106—311; 208—14